(12) United States Patent
Astorga Ramírez et al.

(10) Patent No.: US 8,025,467 B2
(45) Date of Patent: Sep. 27, 2011

(54) COUNTERSINKING-CARRIER NOZZLE

(75) Inventors: Juan Ramón Astorga Ramírez, Cádiz (ES); Manuel Barrios Flores, Cádiz (ES); Paloma Peinado Aguayo, Sevilla (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 693 days.

(21) Appl. No.: 12/071,793

(22) Filed: Feb. 26, 2008

(65) Prior Publication Data
US 2008/0247833 A1 Oct. 9, 2008

(30) Foreign Application Priority Data
Feb. 26, 2007 (ES) .................................. 200700497

(51) Int. Cl.
*B23B 49/00* (2006.01)
(52) U.S. Cl. ............................ 408/95; 408/10; 408/202
(58) Field of Classification Search .................. 408/5, 7, 408/8, 10, 12, 13, 14, 15, 95, 97, 115 R, 202
See application file for complete search history.

(56) References Cited

U.S. PATENT DOCUMENTS

| | | | | |
|---|---|---|---|---|
| 2,891,427 A | * | 6/1959 | Warsap et al. | 408/111 |
| 3,110,226 A | | 11/1963 | Dionne | |
| 3,891,015 A | * | 6/1975 | Calcagno | 144/136.2 |
| 4,242,017 A | * | 12/1980 | De Fazio | 408/111 |
| 4,332,066 A | * | 6/1982 | Hailey et al. | 29/26 R |
| 4,613,262 A | * | 9/1986 | Woods | 409/211 |
| 4,818,154 A | * | 4/1989 | Bye et al. | 408/111 |
| 4,995,148 A | * | 2/1991 | Bonomi et al. | 29/26 A |
| 4,999,896 A | * | 3/1991 | Mangus et al. | 29/34 B |
| 5,848,859 A | * | 12/1998 | Clark et al. | 408/1 R |
| 2006/0104729 A1 | | 5/2006 | Nader et al. | |

FOREIGN PATENT DOCUMENTS

| | | |
|---|---|---|
| DE | 36 11 129 | 10/1987 |
| EP | 1484126 A1 * | 12/2004 |
| JP | 2004017199 A * | 1/2004 |

OTHER PUBLICATIONS

Computer translation of DE 3611129 from EPO website, translated Nov. 7, 2010.*
Computer translation of EP 1484126 from EPO website, translated Nov. 7, 2010.*

* cited by examiner

*Primary Examiner* — Daniel Howell
(74) *Attorney, Agent, or Firm* — Wenderoth, Lind & Ponack, L.L.P.

(57) ABSTRACT

A countersinking-carrier nozzle has a flat front surface with a central hole via which emerges a countersinking drill, such that said flat front surface establishes a limit to the penetration depth of the countersinking nozzle. The nozzle includes a flexible retainer for the nozzle front surface so that it swivels when making contact with a curved countersinking surface, adapting itself tangentially to it while the headstock presses against the countersinking surface. The flexible retainer is defined by a ball-and-socket joint including a curvo-concave retaining receptacle, with the possibility of swivelling, with a complementary curvo-convex portion provided in the rear part of the flat front surface. This portion projects with respect to the receptacle to allow it to swivel when pressed against the countersinking surface, at which moment the complementary curvo-convex portion of the rear part of the front surface swivels in the receptacle of the headstock.

4 Claims, 4 Drawing Sheets

COUNTERSINKING-CARRIER NOZZLE

OBJECT OF THE INVENTION

The nozzle of the invention is of the type that is provided with a flat front surface endowed with a central hole via which emerges a countersinking drill, in such a way that the limit defining the depth of the countersinking is established by the flat front surface at the moment of pressing against the countersinking surface; and which has the object of providing a flexible nozzle which swivels and adapts itself to the shape of the surface on which the countersinking is being carried out. For the case in which this surface is curved, the depth of countersinking required is maintained in such a way that the rivet, screw or similar that has to be housed in the countersinking does not project with respect to the surface in which it is fixed.

Another object of the invention is to prevent the flexible part of the nozzle from being able to become detached when it makes sudden contact with the countersinking surface.

In general, the invention is applicable to any type of countersinking-carrier nozzle whose depth of countersinking depends on the moment in which the surface of the nozzle presses against the countersinking surface. More particularly, the invention is applicable to headstocks governed by numerical control machines in which the depth of the countersinking has to be kept within the permitted margins of tolerance even when the countersinking is being carried out on curved surfaces. The primary application of the invention is expected to be in the industrial sector of aeronautics for fitting the external lining of aircraft.

PRIOR ART OF THE INVENTION

When fitting the lining of an aircraft, the use is known of machines and robots for drilling and countersinking by numerical control, comprising a headstock fitted with a nozzle that includes a flat front surface via which emerges the countersinking drill, in such manner that the headstock is displaced by the numerical control machine in the forward and backward direction in order to effect the successive drillings and countersinkings in which a rivet will later on be housed to form the joint, in such a way that the depth of the countersinking is sufficient so that the rivet does not project above the surface of the lining.

To achieve this, the headstock incorporates a spring such that when the flat front surface of the nozzle is pressed against the countersinking surface, the displacement of the headstock takes place, overcoming the action of the spring, until this displacement activates some micro-switches which instruct the numerical control to withdraw the headstock since the appropriate drilling and countersinking have taken place. This type of headstock displays the drawback that the flat front surface is integral with the headstock which means that, when the flat front surface of the nozzle presses against a curved surface of the lining, the micro-switches are activated before the countersinking has reached the required depth given that it is one of the ends of the flat front surface that presses against the curved countersinking surface, with part of the flat surface remaining without making contact with the surface of the lining. This prevents the countersinking from going as deep as the required measurement within the margins of tolerance so that the subsequent rivet does not project with respect to the surface of the lining. So, zones of the lining that have a curved surface need to be gone over by hand in a subsequent phase, which delays the assembly process and makes it more expensive.

This problem was corrected in patent document WO 2006/134180, which describes a nozzle comprising an axial ball-and-socket joint consisting of a circular ring made of a ferromagnetic material which is secured to the headstock by means of some magnets inserted into holes, in such manner that the ring is allowed to swivel when pressed against the curved surface on which the countersinking is performed, thus permitting countersinking to be carried out to the required depth. This device displays the serious drawback that when the ring makes sudden contact with the countersinking surface it becomes detached since in this situation the magnets are incapable of retaining the ring, which means that the process has to be stopped in order to reposition the ring in the headstock.

DESCRIPTION OF THE INVENTION

In order to solve the drawbacks and achieve the objectives stated above, the invention has developed a new nozzle that permits the depth of countersinking to be obtained within the established margins of tolerance, even when the countersinking is done on curved surfaces, and all this without there existing any risk of a part of the headstock becoming detached, above all when the headstock makes sudden contact with the countersinking surface, thereby avoiding having to stop the process due to such an occurrence.

The inventive nozzle, as with conventional designs, is provided with a flat front surface that includes a central hole via which emerges a countersinking drill, in such a way that said flat front surface establishes a limit to the depth of penetration of the countersinking nozzle; and it comprises flexible means of retention of the flat front surface of the nozzle so that it swivels when making contact with a curved countersinking surface, adapting itself tangentially to it while the headstock presses against the countersinking surface, which means that the countersinking drill goes deeper, obtaining a countersinking within the margins of tolerance.

The novelty of the invention lies in the fact that the flexible means of retention of the flat front surface are defined by a ball-and-socket joint which comprises a curvo-concave retaining receptacle, with the possibility of swivelling, with a complementary curvo-convex portion provided in the rear part of the flat front surface, this being done in such manner that this portion projects with respect to the receptacle in order to allow it to swivel when pressed against the countersinking surface, at which moment the complementary curvo-convex portion of the rear part of the flat front surface swivels in the receptacle of the headstock.

This arrangement of the receptacle and complementary portion keeps the latter retained in the former so that the complementary curvo-convex portion cannot become displaced from the receptacle, even in the case in which the flat front surface makes sudden contact with the curved countersinking surface such that the process has to be stopped due to detachment of the one of the pieces of the nozzle, as occurs in the document of the State of the Art closest to the invention when the headstock makes contact with the countersinking surface.

The invention provides for the receptacle to be able to be made in the headstock itself or be an independent piece fixed to the headstock by means of pins running through the holes made in the headstock and in the piece constituting the receptacle. This design permits the piece to be removed in order to change the ball-and-socket joint or for its maintenance.

The invention is of special application in headstocks governed by numerical control machines that include means of longitudinal displacement of the headstock in the forward and backward direction; and means of detection of the moment at which the flat front surface presses against the countersinking surface in order to withdraw the headstock; in such manner that the countersinking is carried out automatically.

Below, in order to facilitate a better understanding of this specification and forming an integral part thereof, a series of figures are attached in which, on an illustrative rather than limiting basis, the most characteristic details of the inventive object have been represented.

DESCRIPTION OF THE PREFERRED FORMS OF EMBODIMENT

Figure 1:
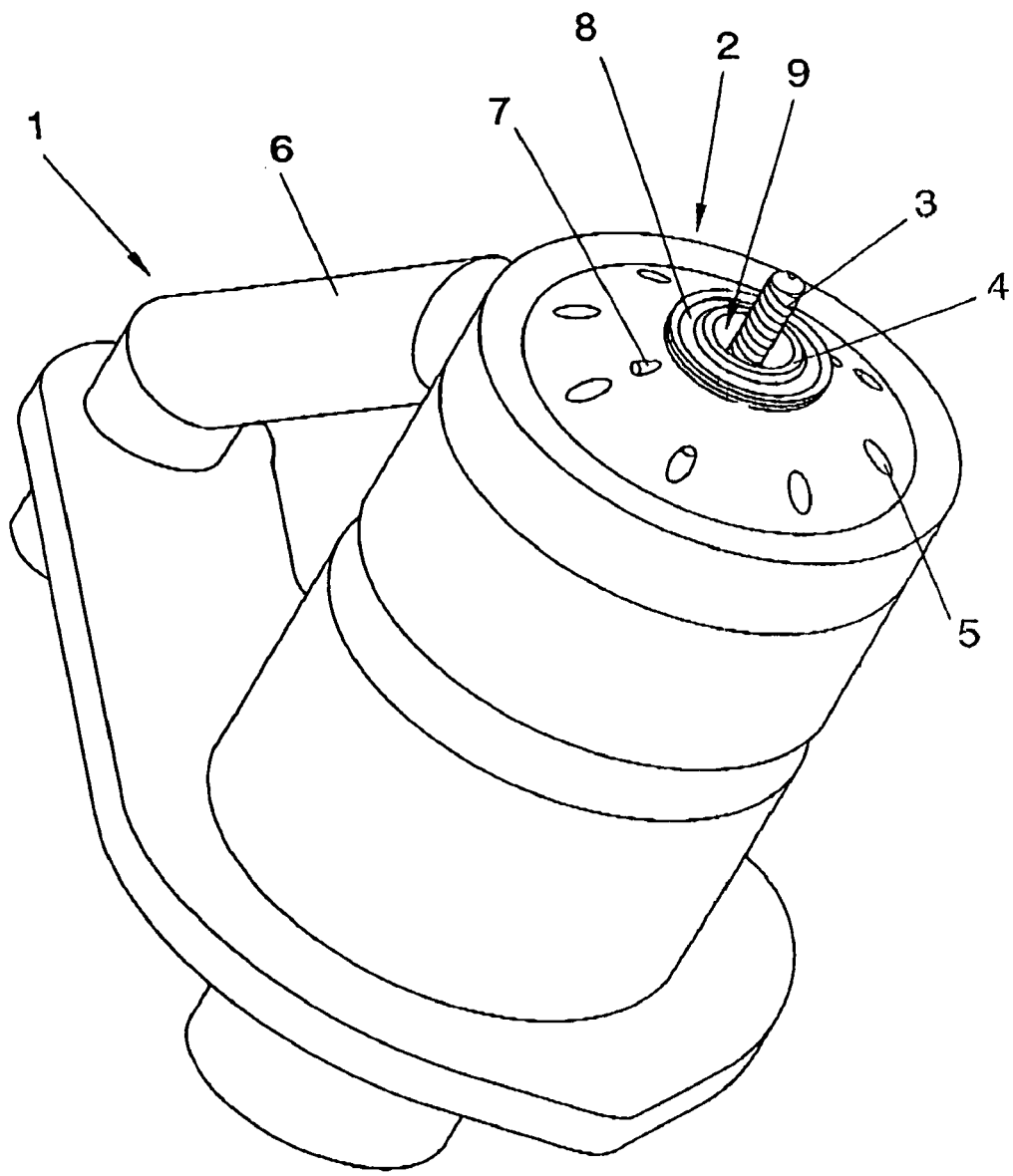
FIG. 1.—Shows a schematic view in perspective view of a headstock in which a possible embodiment of the inventive nozzle has been incorporated.
Figure 2:
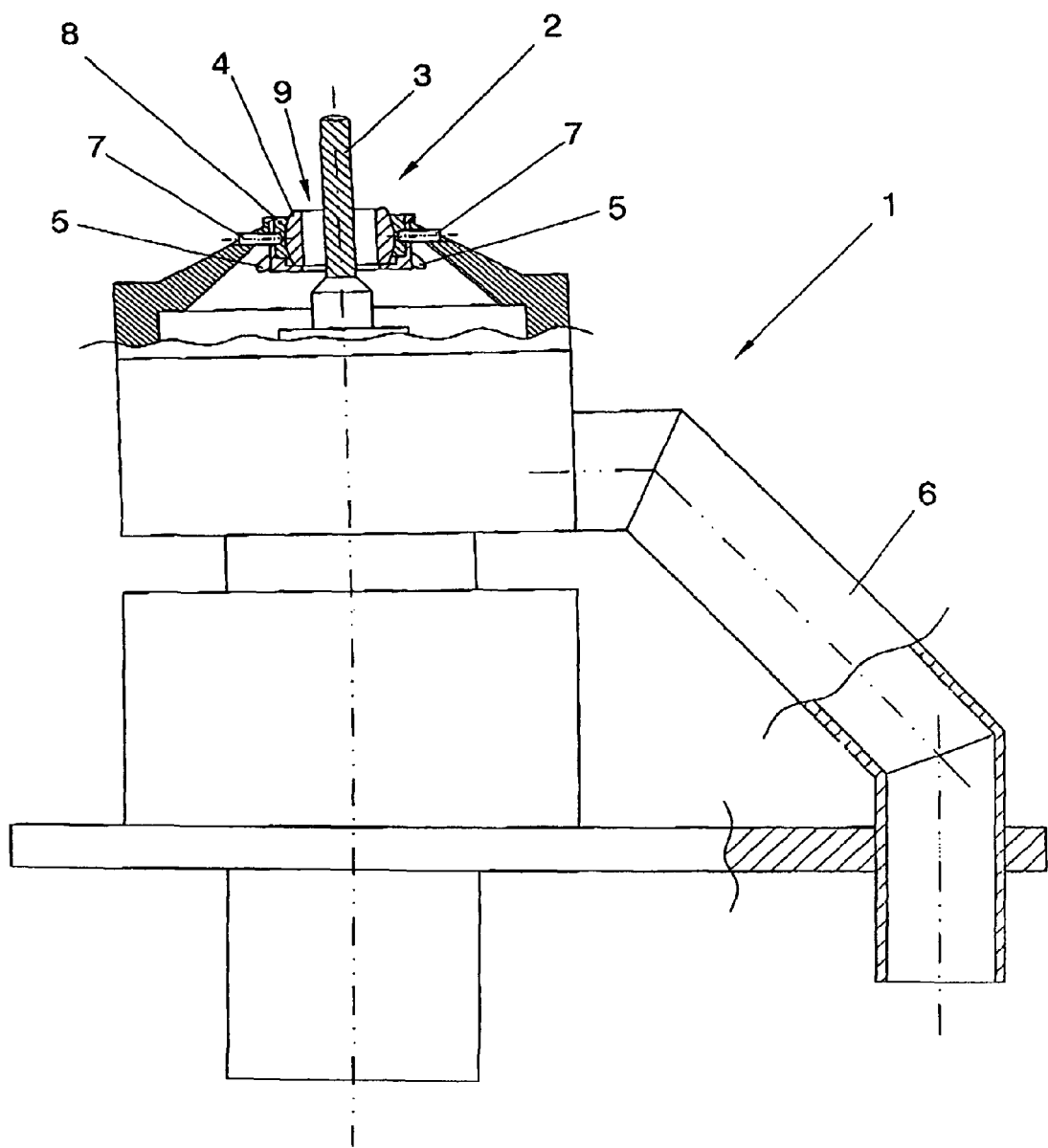
FIG. 2.—Shows a partially sectioned schematic view of the headstock of the previous figure.

Given below is a description of the invention based on the figures commented upon above.

It comprises a nozzle 2, which is applied to a conventional type of headstock 1 which is governed by means of a numerical control machine or robot in order to effect its longitudinal displacement in the forward and backward direction and thereby automatically perform different drillings and countersinkings on a surface, such as for example in the case of the lining of an aircraft, in which these drillings and countersinkings are required to be made in order to subsequently permit securing of the lining to the structure of the aircraft by means of a rivet or similar.

The nozzle 2 comprises a ball-and-socket joint consisting of a piece 8 fixed to the headstock 1, which in the example of embodiment is secured by means of some pins 7 which are introduced under pressure into holes made in the casing of the headstock and of the piece 8, and in which a flat front surface 4 is housed with the possibility of swivelling, for which the rear portion of the latter comprises a complementary curvo-convex surface of a curvo-concave receptacle provided in the piece 8.

Figure 3:
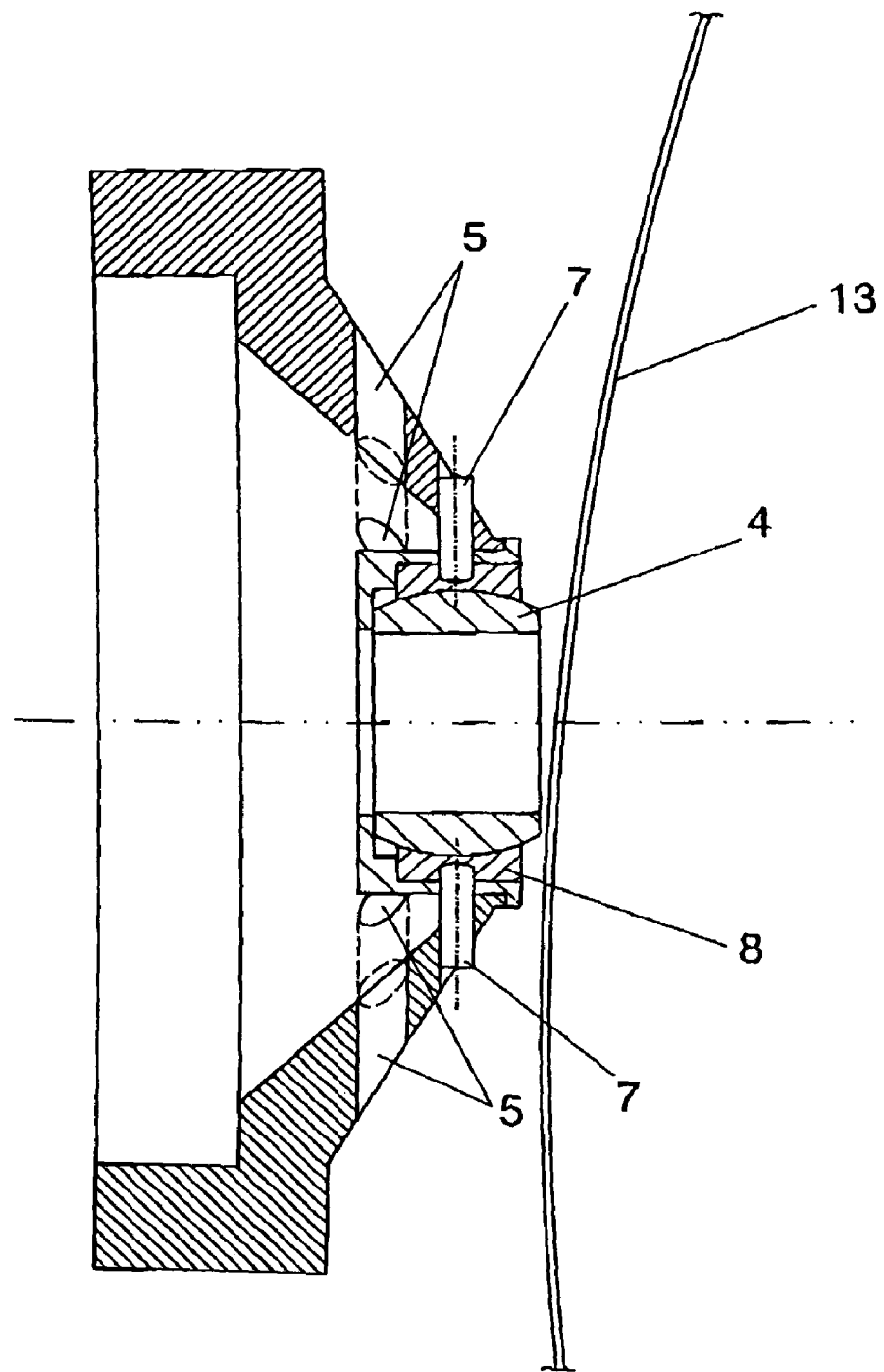
FIG. 3.—Shows a detail of FIG. 2, when the nozzle is at the point of making contact with a curved surface on which the countersinking is being carried out. In this figure the drill has been eliminated for the purposes of simplification and in order to aid an understanding of the invention.
Figure 4:
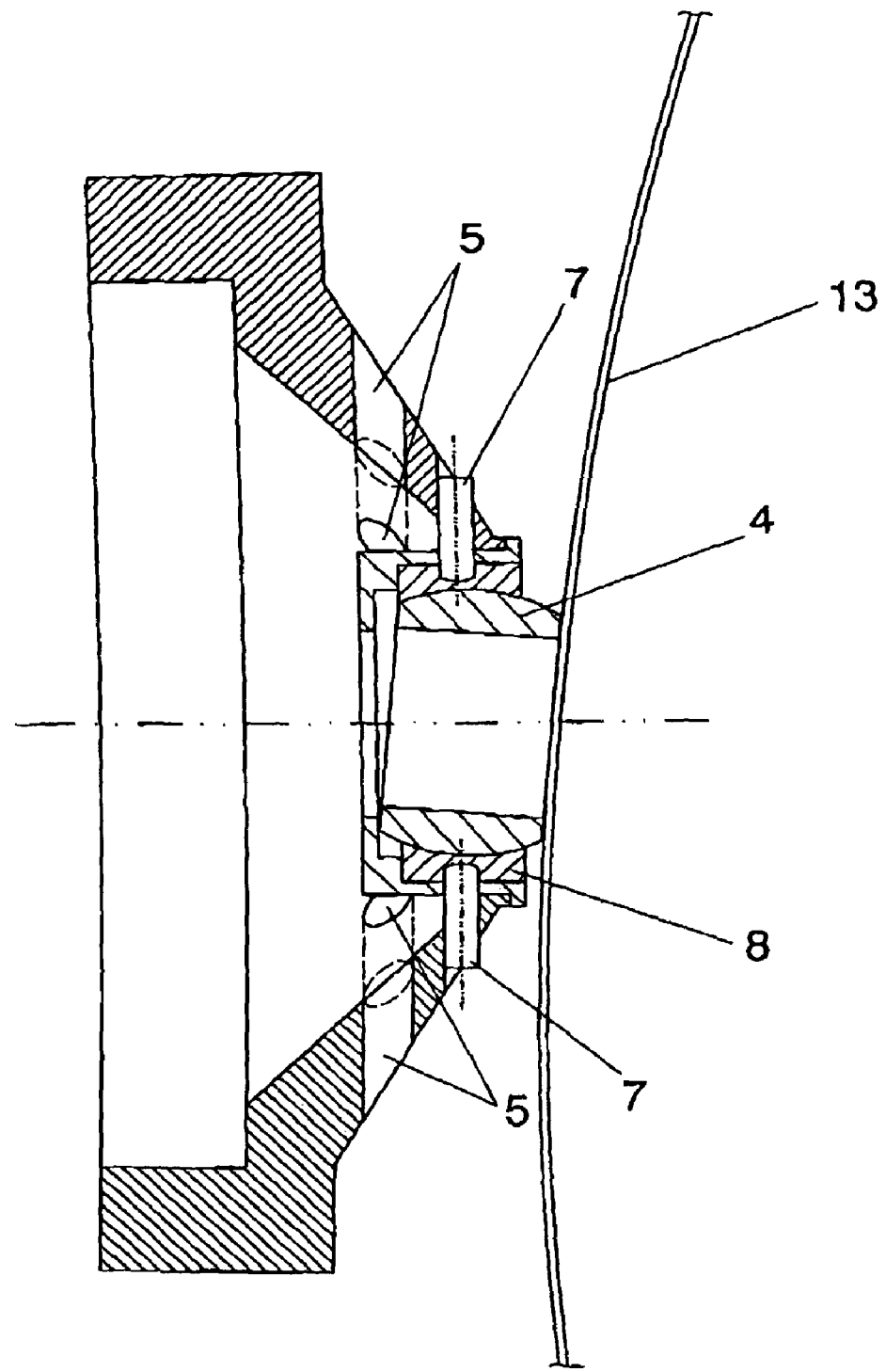
FIG. 4.—Shows the nozzle of the previous figure in the position in which it presses against the curved surface and swivels, orientating itself tangentially to said curved surface, which provides the correct depth of countersinking.

The flat front surface 4 is endowed with a central hole 9 through which runs a countersinking drill 3 in such a way that when a robot longitudinally displaces the headstock 1, the countersinking drill 3 initiates the drilling until the surface 4 makes contact with the countersinking surface 13. The example of embodiment is described for the case in which the countersinking is performed on a curved surface 13, which are the ones most likely to be present in the problem described in the above sections. So, when the flat front surface 4 makes contact with the curved surface 13, as shown in FIG. 3, the robot continues to carry out the longitudinal forward displacement of the headstock 1, with which the flat front surface 4 swivels, displacing its curvo-convex surface on the curvo-concave surface of the receptacle of the piece 8 until the flat front surface is arranged tangentially to the curved surface 13, as shown in FIG. 4, which permits the countersinking drill 3 to continue forward going deeper until the flat front surface meets up against the curved surface 13, at which point it cannot swivel any more on the piece 8. In this instance, the robot carries on effecting the longitudinal forward displacement of the headstock 1, which is assisted by a conventional spring (not represented) causing the headstock 1 to be displaced backwards. Moreover, the headstock is integral with some conventional micro-switches (not represented) which are therefore displaced in accordance with the movement of the headstock 1, until they press with the support of the headstock causing the said micro-switches to actuate. This is detected by the robot which, at that instant, carries out the backward displacement of the headstock withdrawing the countersinking drill 3 from the hole and the countersinking that have been created, remaining ready to perform a new advance of the headstock and consequently a new drilling and countersinking.

Consequently, in this embodiment, the nozzle 2 consists of a ball-and-socket joint which presents the arrangement that has been described and which swivels in order to adapt itself to the curved surface 13, with which the depth of countersinking manages to acquire the required value within the permitted tolerance for housing a rivet or similar, in such manner that it sits at the level of the curved surface 13 without projecting with respect to it.

Moreover, the arrangement that has been described prevents the flat surface 4 from being able to become detached from the piece 8, even in the event that, when carrying out the advance of the headstock, the robot causes the flat surface 4 to suddenly make contact against the curved surface 13, thereby assuring correct functioning of the nozzle at all times.

Reference 5 represents some holes which connect with a suction duct 6 for swarf generated when carrying out the drilling and countersinking, and which likewise are conventional elements and therefore not described in further detail.

The invention claimed is:

1. A countersinking-carrier nozzle, which comprises a flat front surface (4) endowed with a central hole (9) through which emerges a countersinking drill (3) in order to establish a depth limit of countersinking when the flat front surface (4) presses against the countersinking surface (13); and includes flexible means of retention of the flat front surface (4) so that it swivels when contacting with a curved countersinking surface (13) and adapts itself and presses against it tangentially while the pressure is maintained;
   wherein the flexible means are defined by a ball-and-socket joint (2) comprising a curvo-concave retention receptacle (8), with possibility of swivelling, a complementary curvo-convex portion provided in the rear part of the flat front surface (4), which projects from the receptacle (8); all this in order to avoid displacement of said complementary curvo-convex portion and of said flat front surface (4) when the latter abruptly makes contact with the curved surface (13);
   wherein the receptacle (8) is retained in a headstock (1), with possibility of swivelling, the rear complementary portion of the flat front surface (4) being provided in one piece (8) mounted to the headstock (1); and
   wherein the receptacle piece (8) is secured to the headstock (1) by pins (7) which run through holes made in the headstock (1) and in the piece constituting the receptacle (8).

2. A countersinking-carrier nozzle, which comprises a flat front surface (4) endowed with a central hole (9) through which emerges a countersinking drill (3) in order to establish a depth limit of countersinking when the flat front surface (4) presses against the countersinking surface (13); and includes flexible means of retention of the flat front surface (4) so that it swivels when contacting with a curved countersinking surface (13) and adapts itself and presses against it tangentially while the pressure is maintained;

wherein the flexible means are defined by a ball-and-socket joint (2) comprising a curvo-concave retention receptacle (8), with possibility of swivelling, a complementary curvo-convex portion provided in the rear part of the flat front surface (4), which projects from the receptacle (8); all this in order to avoid displacement of said complementary curvo-convex portion and of said flat front surface (4) when the latter abruptly makes contact with the curved surface (13); and wherein the nozzle is applied in a headstock (1) governed by a numerical control machine which includes means of longitudinal displacement of the headstock in the forward and backward direction and means of detection of the moment in which the flat front surface presses against the countersinking surface in order to cause the headstock to withdraw.

3. A countersinking-carrier nozzle, which comprises a flat front surface (4) endowed with a central hole (9) through which emerges a countersinking drill (3) in order to establish a depth limit of countersinking when the flat front surface (4) presses against the countersinking surface (13); and includes flexible means of retention of the flat front surface (4) so that it swivels when contacting with a curved countersinking surface (13) and adapts itself and presses against it tangentially while the pressure is maintained;

wherein the flexible means are defined by a ball-and-socket joint (2) comprising a curvo-concave retention receptacle (8), with possibility of swivelling, a complementary curvo-convex portion provided in the rear part of the flat front surface (4), which projects from the receptacle (8); all this in order to avoid displacement of said complementary curvo-convex portion and of said flat front surface (4) when the latter abruptly makes contact with the curved surface (13);

wherein the receptacle (8) is retained in a headstock (1), with possibility of swivelling, the rear complementary portion of the flat front surface (4) being provided in one piece (8) mounted to the headstock (1); and wherein the nozzle is applied in the headstock (1), and the headstock (1) is governed by a numerical control machine which includes means of longitudinal displacement of the headstock in the forward and backward direction and means of detection of the moment in which the flat front surface presses against the countersinking surface in order to cause the headstock to withdraw.

4. COUNTERSINKING-CARRIER NOZZLE, according to claim 1, wherein the nozzle is applied in a headstock (1) governed by a numerical control machine which includes means of longitudinal displacement of the headstock in the forward and backward direction and means of detection of the moment in which the flat front surface presses against the countersinking surface in order to cause the headstock to withdraw.

\* \* \* \* \*